United States Patent [19]

Brewer

[11] Patent Number: 4,620,561

[45] Date of Patent: Nov. 4, 1986

[54] DIFFERENTIAL PRESSURE CONTROL VALVE

[75] Inventor: Donaldee Brewer, Muscatine, Iowa

[73] Assignee: Bandag Licensing Corporation, Muscatine, Iowa

[21] Appl. No.: 736,039

[22] Filed: May 20, 1985

[51] Int. Cl.⁴ .............................................. G05D 16/00
[52] U.S. Cl. .................................................. 137/116.3
[58] Field of Search ............................... 137/85, 116.3

[56] References Cited

U.S. PATENT DOCUMENTS 3,021,858  2/1962  Kirk ....................................... 137/85

FOREIGN PATENT DOCUMENTS 2819679  11/1978  Fed. Rep. of Germany ... 137/116.3

Primary Examiner—Alan Cohan
Attorney, Agent, or Firm—Frank B. Hill

[57] ABSTRACT

This invention is directed to a differential control valve. The differential pressure is maintained by differing area surfaces on a piston assembly which will be balanced at a predetermined differential established at the manufacturing operation. There is a spring member operating on two valve balls which provides a delayed pressurization of the controlled chamber. The control valve has a ball valve at the exit port to control the low pressure side of the differential control valve assembly, providing a fail-safe system with no adjustments required after manufacture if there is a pressure increase downstream.

5 Claims, 4 Drawing Figures

DIFFERENTIAL PRESSURE CONTROL VALVE

This invention relates generally, as indicated, to controlling a source pressure compared to a second pressure source. Problems have been experienced by pressure differential control systems where the user can adjust the pressure differential and defeat the purpose of the system. The prior systems also did not provide a fail-safe operation if there was a malfunction causing a pressure increase in the lower pressure portion of the differential pressure control valve.

The present invention covers a differential pressure control valve which has an automatic system to provide a preselected delayed pressurization of the lower pressure chamber permitting other functions to take place during this period beneficial to the application.

The invention also includes a means to automatically close off the exhaust portion of the differential pressure control valve when operating conditions have been met which can automatically be deactivated if a malfunction in another part of the system increases the pressure in the lower pressure chamber so that the increased pressure can be exhausted to atmosphere.

The invention, accordingly, comprises a structure hereinafter described. The scope of the invention being indicated in the following claims. In the accompanying drawings, the preferred embodiment of the invention is illustrated and a method of its application disclosed.

The invention will be further understood from the following, more detailed, description taken with the drawings in which.

Figure 1:
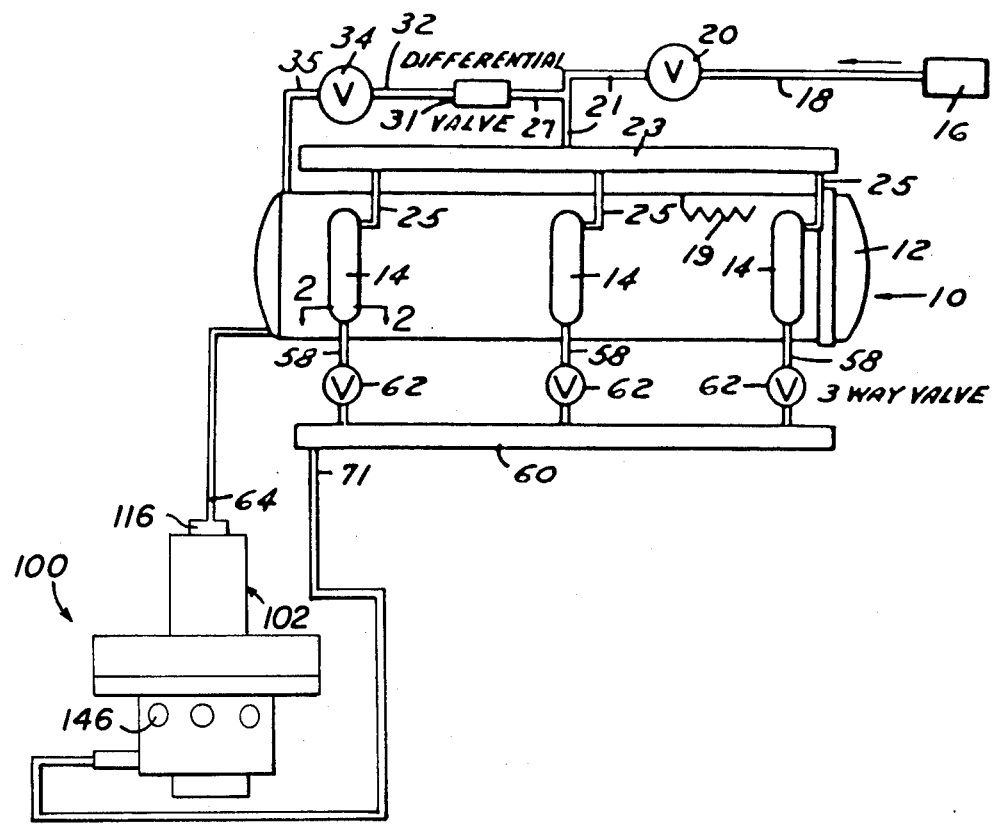
FIG. 1 is a schematic view of a tire retreading system illustrating an application of the present invention.

Referring generally to FIG. 1, there is illustrated a tire retreading system, including an autoclave or pressure vessel, generally referred to as 10 which is adapted to receive through an enclosure 12 a plurality of tire assemblies 14 for retreading. Interior of the vessel 10 can be pressurized from a fluid pressure 16 by way of a shop pressure line 18 with air, water, steam or a mixture of steam and air. The pressurizing medium is heated either before introduction into the vessel or after introduction by means of a heater as indicated by numeral 19 located in the vessel 10. The shop pressure line 18 may be pressurized at approximately 115 PSI, for example. The line 18 is connected to a regulator valve 20 which adds pressure up to 150 PSI and is then closed. A line 21 passes fluid to a tire inflation manifold 23 from valve 20. The fluid passes from manifold 23 through the tire inflation line 25, which inflates the curing tube 26 of the tires to a predetermined pressure of 115 PSI. A pressure vessel fill line 27 is connected to line 21 between valve 20 and the manifold 23. The line 27 connects to a differential check valve 31, which opens when the pressure in line 27 is 30 PSI higher than the downstream pressure pass valve 31. A line 32 connects valve 31 to a pressure regulator valve 34, which will close when the pressure in line 32 reaches 85 PSI. A line 35 connects the valve 34 to the pressure vessel 10.

Figure 2:
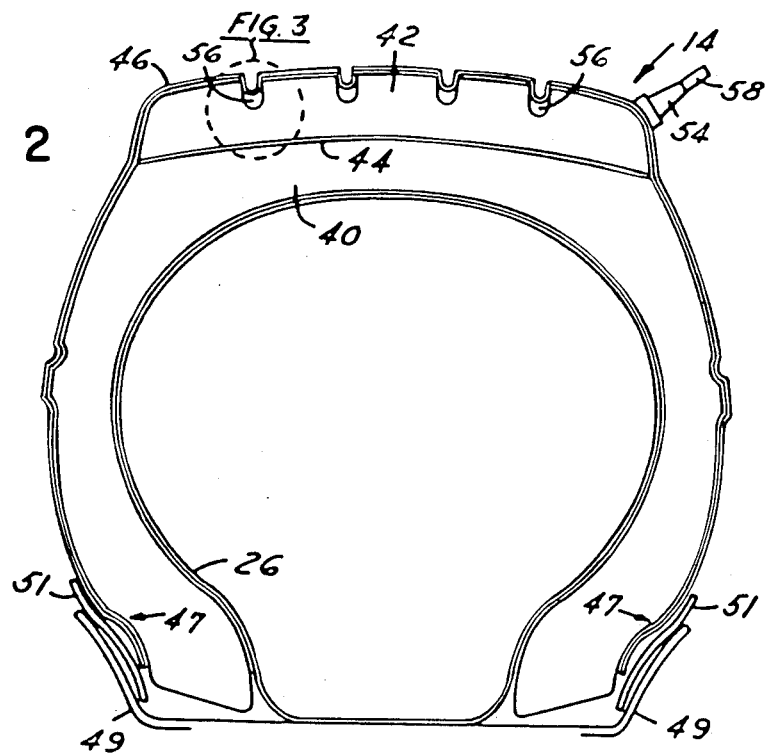
FIG. 2 is a cross-section of a tire assembly as mounted in FIG. 1 taken along line 2—2 of FIG. 1.
Figure 3:
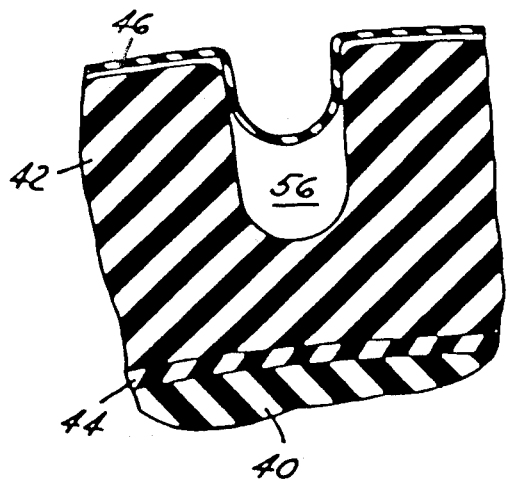
FIG. 3 is a view taken from the circled area of FIG. 2 illustrating the envelope's action on the groove and the pressure differential of the system controlled by the differential pressure control valve.
Figure 4:
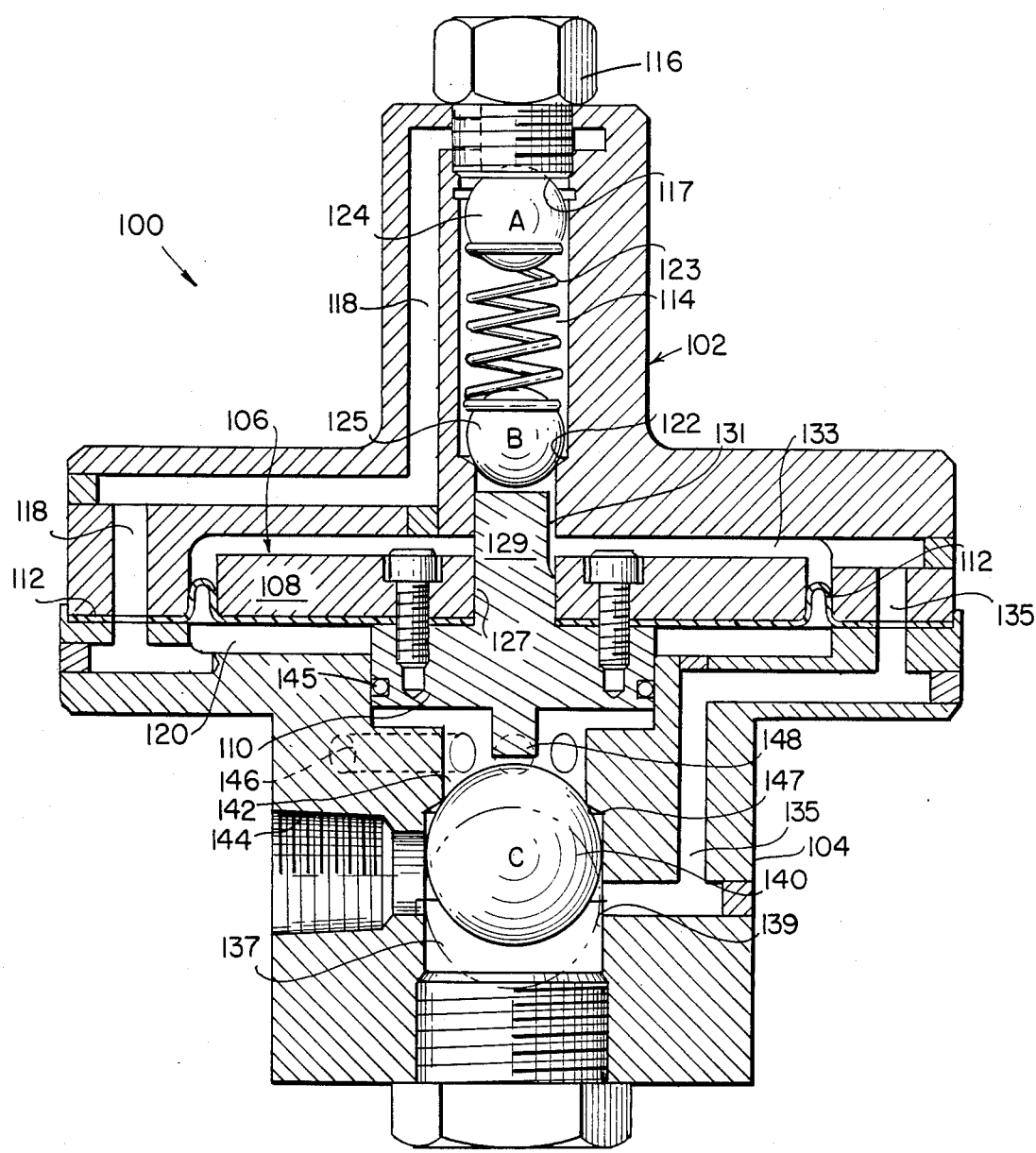
FIG. 4 is a cross-sectional view illustrating the principles of the present invention in its preferred embodiment.

Each tire assembly 14, best viewed in FIG. 3, includes a tire casing 40, a precured tread 42, and a layer of rubber-base bonding material 44, sometimes referred to as cushion gum, between the upper surface of the tread 42 and the crown surface of the tire casing 40. A flexible fluid tight member 46, sometimes referred to as an envelope, is made of rubber, for example, overlies the tread 42. The embodiment in FIG. 2 illustrates the member 46 being held in sealing contact to the sidewalls of the tire casing 40 at location 47 and that the tire casing is inflated as disclosed, for example, in U.S. Pat. No. 4,434,018. A tire casing 40 is mounted on a rim 49 with the flange member 51 positioned on the rim. The envelope member 46 is positioned between the flange and the tire casing 40. Pressure in the curing tube forces the envelope 46 into sealing contact with the tire casing 40 along the area designated as 47. The flexible member 46 is provided with a fitting 54 which places the space 56 between the envelope 46 and the tread 42 with the conduit 58. Conduit 58 pass through the pressure chamber 10 and connect with an envelope manifold 60 as shown in FIG. 1. Along the path of conduit 58, is provided a valve member 62. Valve member 62 has three positions. It can be closed, it can be open to the envelope manifold, or it can be opened to the atmosphere.

The overall function of the illustrated system is, of course, to pressurize the tread 42 against the tire casing 40 by means of fluid in the chamber 10 and simultaneously to heat the bonding material or cushion gum 44 to a temperature at which it can be vulcanized, securing the tread to the tire casing. A line 64 connects the chamber to a pressure differential control valve 100. The full function of the pressure differential control valve will be explained in detail below. The high pressure coming into the differential pressure control valve 100 from the pressure line 64 will pass through the differential pressure control valve into the pressure line 71, which is connected to the envelope manifold 60. The pressure in the envelope manifold 60 will pass through the valve members 62 into conduit 58 and into the envelope 46.

The purpose of the control valve is to apply pressure in the space 56 between the envelope member 46 and the precured tread 42 during the curing operation. The differential pressure control valve 100 has two major portions. These are top cap 102 and bottom cap 104. These two members are secured together in a conventional manner by cap screws not shown. A piston assembly 106 is positioned between top cap 102 and bottom cap 104. The piston assembly has a piston plate 108 and a piston member 110 held together by connecting screws 111. Positioned between the piston plate and the piston member is diaphragm 112. The diaphragm extends out and is positioned as the sealing element between the top cap 102 and the bottom cap 104.

The top cap 102 has a control chamber 114 that extends through its central portion. An inlet nut 116 is screwed into the upper end of the control chamber 14 and has an inlet seat 117 at its bottom, portion. The inlet nut is connected to pressure line 64 and receives pressure from that line. There is an inlet port 118 that extends from the inlet nut 116 to the bottom of the top cap 102 and exits into a high pressure chamber 120. The control chamber 114 has a control seat 122 at its lower end. A ball spring assembly is positioned between the inlet seat 117 and the control seat 122. The ball spring assembly includes a force spring member 123, an inlet ball 124, and a control ball 125. The spring 123 urges the inlet ball 124 into sealing contact with the inlet seat 117 and the control ball 125 into sealing contact with the control seat 122.

The piston assembly 106 has an opening 127 which receives a ball activator shaft 129 that extends through the opening 127 into the bottom end of the control chamber 114. The ball activator shaft 129 has a shaved surface on part of its circumference which permits a passage port 131 to connect the control chamber 114 to a lower pressure chamber 133, which is part of the top cap 102. The lower pressure chamber 133 connects to an exit port 135 which passes from the top cap 102 through the bottom cap 104 into the bottom cap chamber 137.

The bottom cap 104 has a fitting plug 138 screwed into the bottom cap chamber, which provides an initial seat 139 for envelope ball 140. The bottom cap chamber 137 connects with an exhaust chamber 142 and an envelope outlet 144. The exhaust chamber 142 has an opening at its upper end to receive the piston member 110 of the piston assembly 106. A sealing ring 145 is provided in the piston member 110 to seal the high pressure chamber from the exhaust chamber 142. Exhaust ports 146 are provided from the exhaust chamber to the atmosphere outside the differential pressure control valve. The envelope outlet 144 connects to the line 71 which is connected to the envelope manifold 60. The exhaust chamber 142 has an exhaust seat 147 at the upper end of the bottom cap chamber.

When the pressure vessel 10 is being activated to retread tires, it is desirable to have the chamber 10 under pressure that acts on envelope member 46 of the tire assembly 14. This will assist in expelling any undesirable air between the precured tread 42 and the tire casing 40. After the pressure in chamber 10 has had time to initially act on the envelope 46, expelling any residue, the system is then prepared to receive pressure in the space 56. This is the function of the spring assembly and the envelope ball 140, as will be explained in detail below.

As the chamber 10 is starting to fill up with pressure, the pressure will pass to line 64 into the outlet nut 116. This pressure will be transferred to the high pressure chamber 120 through the inlet port 118. As the pressure initially acts on the lower surface area of the piston plate 108, the piston assembly 106 will be moved to an up position. The ball activator shaft 129 will contact the control ball 125. As soon as there is enough pressure in the high pressure chamber 120 to overcome the forces of spring 123, the control ball 125 will be removed from the control seat 122. At this time, the inlet ball 124 will be in sealing contact with the inlet seat 117. When the pressure from the inlet nut 116, acting on inlet ball 124, reaches approximately 10–12 PSI, the inlet ball 124 will be removed from the inlet seat 117, permitting air to pass into the control chamber 114 and pass the control ball 125 into the lower pressure chamber 133 through the passage port 131. The upper surface area of the piston plate 108 will be acted on by this pressure. The lower and upper surface areas of the piston plate can be made in various ratios to predetermine the pressure differential between the entering and exit pressures of differential pressure control valve 100. In our present illustration, the differential pressure requires 15 to 17 PSI more pressure on the high pressure chamber side of piston plate 108 than the low pressure chamber side of piston plate 108 for the control valve 100 to be in balance. As the pressure enters the low pressure chamber 133, it will pass to the exit port 135 and pass over the envelope ball 140, which is in its initial position shown in phantom. In the initial position, the envelope ball is in contact with initial seat 139. There is a space between the exit port 135 and the envelope ball 140 permitting the air to pass over the ball and into the exhaust chamber 142 and out through the exhaust ports 146 to atmosphere. The pressure which was squeezed out of the tire assembly 14 would pass through line 71 to the envelope outlet 144, then into the exhaust chamber 142 and out through the exhaust ports 146. This condition will remain until the pressure in the export line 135 reaches approximately 25–30 PSI. The velocity of the air passing over the envelope ball 140 will draw the ball to its up position to be seated in sealing contact with the exhaust seat 147, thus sealing off the exhaust chamber 142 and the exhaust ports 146 from any pressure source. The pressure from the exit port 135 will then pass through the bottom cap chamber 137 through the envelope outlet 144 into the envelope manifold 60.

When the pressure vessel 10 is pressurized to 85 PSI, the pressure regulator valve 34 will be closed and the pressure in the pressure vessel will be stabilized at 85 PSI. At this time, the pressure in the high pressure chamber 120 will be 85 PSI and when the pressure in the low pressure chamber reaches 70 PSI, the piston assembly 106 will be equalized. At this time, the spring 123 will move the control ball 125 back into sealing contact with the control seat 122 and no further pressure can be transferred into the low pressure chamber from line 64. The pressure in the low pressure chamber 133 will pass through the exit port 135 into the bottom cap chamber 137 and will hold the envelope ball 140 in sealing position at the exhaust seat 147, and the system is now stabilized.

If, for some reason, one of the envelope members 46 would experience a small leak, the additional pressure would move back into the envelope manifold 60 and pass through line 71 into the envelope outlet 144 and would raise the pressure in the bottom cap chamber 137, thus increasing the pressure in the exit port 135 and in the low pressure chamber 133. At this time, the piston assembly 106 would be moved down because of the imbalance between the pressures in the high pressure chamber 120 and the low pressure chamber 133. A ball actuator 148 will contact the envelope ball 140, moving it off exhaust seat 147 so the increased pressure would be discharged through the exhaust chamber 142 and the exhaust ports 146 until the predetermined pressure differential is reached.

If there is a small leak, this arrangement can handle the overflow of pressure. If there is a large leak, the operator will hear the whistle sound from the volume of air discharging through the exhaust ports 146. The operator can determine the tire assembly 14 causing the problem by checking the individual valves 62. When the correct tire assembly 14 is determined, that valve 62 can be vented to the atmosphere so as not to jeopardize the other tire assemblies. While the preferred embodiment of the differential pressure control valve has been shown and described herein in detail, those skilled in the art will recognize various alternative design embodiments for practicing the present invention as defined by the following claims.

What is claimed is:

1. A differential pressure control valve enabling the control of a fluid circuit when the pressure of the fluid passes through the valve to control a predetermined pressure differential between the entering pressure and the exiting pressure, comprising:

(a) a top cap member with a low pressure chamber in its lower surface, (b) a bottom cap member with a high pressure chamber in its upper surface, (c) a piston assembly positioned in said low and high pressure chambers with a diaphragm member that separates said chambers, (d) said entering pressure enters said top cap and is ported to said high pressure chamber, (e) a delay pressurization means to port said entering pressure to said low pressure chamber, (f) said piston assembly having a larger surface area in the low pressure chamber than in the high pressure chamber, (g) said delay pressurization means is positioned in a control chamber in said top cap that ports said entering pressure to said low pressure chamber, (h) said means includes an inlet ball adjacent in inlet seat and a control ball adjacent a control seat, (i) said means includes a force spring between said inlet and control balls which urges them towards their adjacent seats, (j) said piston assembly having a ball activator shaft to act on said control ball and move it off the control seat when the low pressure chamber has a pressure below the predetermined pressure differential, (k) said inlet ball will move off the inlet seat when the entering pressure exceeds the preselected pressure of the force spring, and (l) when said inlet ball and control ball are off their seats, the entering pressure passes to the low pressure chamber until the said predetermined pressure differential is met and the said ball activator shaft moves away from the control ball permitting it to contact the control seat closing off any flow from the entering pressure to the low pressure chamber.

2. A differential pressure control valve as in claim 1, including:

(a) a diaphragm member separating said high pressure chamber and said low pressure chamber.

3. A differential pressure control valve as in claim 2, including:

(a) said diaphragm member having sealing contact between said top cap member and said bottom cap member at its outer edge and connected to said piston assembly at its inner edge.

4. A differential pressure contol valve as in claim 1, including:

(a) a bottom cap chamber connected to said lower pressure chamber, (b) an exhaust chamber having exhaust ports connecting it to the atmosphere, (c) an initial seat in said bottom cap chamber, (d) an envelope ball in said bottom cap chamber and initially positioned on said initial seat, (e) an exhaust seat separating said bottom cap chamber and said exhaust chamber, (f) an outlet connecting said bottom cap chamber to a controlled member, and (g) said envelope ball making sealing contact with said exhaust seal when said piston assembly is in balance.

5. A differential pressure control valve as in claim 4, including:

(a) said piston assembly having a ball activator member to act on said envelope ball and move it off the exhaust seal when the low pressure chamber has a pressure above the predetermined pressure differential.

* * * * *